United States Patent Office 3,414,374
Patented Dec. 3, 1968

3,414,374
COMPLEXES OF NITROGEN, PHOSPHORUS, OXYGEN AND ALUMINUM AND/OR CHROMIUM AND METHOD OF PRODUCING THE SAME
Ernest Stossel, 203 W. 81st St.,
New York, N.Y. 10024
No Drawing. Filed Apr. 29, 1965, Ser. No. 451,959
25 Claims. (Cl. 23—105)

ABSTRACT OF THE DISCLOSURE

A complex containing complexed nitrogen, phosphorus and oxygen, and having the general empirical formula:

$$[P \cdot (N)_{n'} \cdot (O)_{n-4} \cdot w(H_2O)]_p \overset{(R)_r \ (H)_h}{\underset{|\quad\ |}{}}$$

wherein $n$ is a number within the range from about 0.1 to about 3, $w$ is a number within the range from 0 to about 100, $P$ is a number within the range from about 1 to about 100, $r$ is a number within the range from 1 to 2, $h$ is a number within the range from about 0 to $(4-n)$ and R is selected from the group consisting of hydrogen and organic radicals having from one to about thirty carbon atoms, and a process for forming the complex by reacting an aqueous acidic solution comprising phosphate and said metal with a nitrogen compound having an $$-\underset{|}{N}H$$

group in the molecule, the hydrogen atom attached to nitrogen being labile, at an elevated reaction temperature within the range from about 150° C. up to the decomposition temperature of the reaction product, whereby during said reacting the pH of the reaction mixture will increase, and, as the pH increases, decreasing the proportion of water to phosphate sufficiently to prevent precipitation of phosphate salt, and prevent hydrolysis of the ionic complex.

---

This invention relates to ionic complexes of nitrogen, phosphorus, oxygen and aluminum and/or chromium in which nitrogen, phosphorus, oxygen and aluminum and/or chromium are in the anion, and to a process for forming such complexes in a highly concentrated aqueous solution of the acid metal phosphates.

Greger U.S. Patents No. 2,460,344, dated Feb. 1, 1949, and 2,538,862, dated Jan. 23, 1951, describes liquid and solid translucent resin-like complex aluminum phosphates and aluminum hydrogen phosphates, which are formed when aluminum hydroxide is dissolved in highly concentrated orthophosphoric acid. These phosphates have a variable water content, which depends on the starting phosphoric acid concentration, and which to some extent determines whether they are liquids or solids. If prepared in relatively concentrated solutions, they have the properties of colloids. When these solutions are dehydrated below a certain water content, their colloidal nature is destroyed and they lose their water dispersable properties.

Callis et al., Chemical Reviews, 54, 777 (1954), describe a series of such polyphosphates as complex aggregation polymers, in which the PO₄ tetrahedra are held together by aluminum ions in the form of three dimensional molecular complexes or networks, the stability and degree of polymerization of which are largely dependent on pH. The degree of polymerization of such polymers may range from 2 to 20,000, according to concentration, pH and temperature. Unfortunately, these aggregation polymers as Callis et al. point out are stable only at very low pHs, below about 2.6, and when the pH is brought above 2.6, the complex may decompose or precipitate. The aluminum retains its usual cationic character, and the phosphate its anionic character, in ionic reactions thereof in aqueous systems.

Aggregation polymers are considered as similar to heteropolyacids. Aggregation polymers may represent a transition between heteropolyacids and metallo-phosphoric acid complexes. As polymers, the Greger acid aluminum phosphates are said to be useful binders in the manufacture of various products, such as ceramics and adhesives. They form a rather tough film on the surface of a substrate, but these films are not compatible with acid-sensitive pigments, National Bureau of Standards, Technical Note D-106.

Complex aluminum phosphates are also disclosed in U.S. Patent No. 2,909,451 to Lawler et al., dated Oct. 20, 1959, which describes aqueous colloidal dispersions of negatively charged particles produced by reacting a water-soluble aluminum salt with at least a stoichiometric amount of water-soluble orthophosphate in an aqueous medium to produce the water-insoluble phosphate. One such phosphate thus obtained is AlPO₄·NH₄H₂PO₄. This precipitate is filtered, washed and dispersed in water by means of a water-soluble phosphate selected from the group consisting of metaphosphates, pyrophosphates, and polyphosphates. The dispersion is used in treating textile fibers and fabrics to improve resistance to soiling.

Louis J. Cohen, J. Am. Chem. Soc., 29, 714–721 (1907) also described this double phosphate of aluminum, $$NH_4H_2PO_4 - AlPO_4$$

and showed from its properties that the aluminum was in cationic form.

Bancroft et al. in U.S. Patents Nos. 2,222,734 and 2,222,735, dated Nov. 26, 1940, prepare colloidal aqueous dispersions of water-insoluble aluminum phosphate salts, using organic amine peptizing agents, such as the alkanolamines, which tend to retain the phosphate in dispersion in soil for some time after application. The amine keeps the phosphate from coagulation by a protective colloid.

The principal problem restricting application of these aluminum phosphates described above is that they are water-insoluble except in very acid media having a pH of 2.6 or below. Therefore, they cannot be used with acid-sensitive pigments, nor any other substances which decompose in or react with strongly acid solutions, such as ammonia, or ammonia-containing compounds, or ammonium hydroxide. Also, the cationic character of the aluminum prevents their use with substances that form insoluble aluminum salts, such as soaps. Because of the high corrosivity of strongly acid media, they also cannot be used on substrates which are sensitive to strong acids, such as easily corroded metals, certain plastics, and certain textile materials, but this restricts their range of usefulness rather severely.

It is apparent that an aluminum phosphate that could be useful in the ways suggested in the prior art and also stable in aqueous solutions having a pH of above 2.6 would fill a long-standing need. However, no one has perceived how such an aluminum phosphate could be prepared, because the experience has been that aluminum phosphates are insoluble or unstable in such solutions.

The art has been interested in non-aluminum-containing nitrogen, phosphorus and oxygen-containing complexes, but these have not been of assistance in resolving the above problems.

Water-insoluble nonmetallic complexes containing nitrogen, oxygen and phosphorus are described in U.S. Patent No. 2,089,697, dated Aug. 10, 1937, to Groebe, prepared by reacting phosphoric acid with urea in the preferred ratio of 3 moles of urea to 1 mole of phosphoric acid. The phosphoric acid is added in a solution concentration of 84% H₃PO₄. The complexes are used to impregnate fibrous materials and particularly, to render electrical insulation flame-resistant.

U.S. Patent No. 3,134,742, dated May 26, 1964, to Wismer et al., also shows nonmetallic reaction products of the various phosphorus acids and oxides with organic nitrogen bases such as urea and its derivatives and the alkylamines. The solid products are water-insoluble.

Woodstock U.S. Patent No. 2,122,122, dated June 28, 1938, discloses a water-softening compound which has the property of holding calcium and magnesium ions of hard water in solution or colloidal suspension in the presence of fatty acid soap solutions. They are formed by reacting $P_2O_5$ with anhydrous ammonia at temperatures above 150° C. Woodstock described his products as ammonium salts of a phosphoric oxide-nitrogen acid radical, which could be formed into a water-soluble, nonhygroscopic powder having a normal pH between 6 and 7 in 0.25% solution, and in which the nitrogen is present as an ammonium cation, and also as nuclear nitrogen incapable of liberation by caustic solution. Monovalent and bivalent metal cations can be substituted for the ammonium cation, and this presumably explains the sequestering action of the complexes.

Jones et al. U.S. Patent No. 2,717,198, patented Sept. 6, 1955, also describe similar nonmetallic ammonia-phosphorus pentoxide complexes formed by the reaction of substantially anhydrous ammonia and phosphorus pentoxide. Elemental phosphorus is ignited in an excess of dry air, and the combustion products immediately reacted with substantially anhydrous gaseous ammonia to form an intermediate which is then subjected to further heating to form the final complex. The complex may be divided into two products, a highly water-soluble complex, and a moderately to substantially water-insoluble complex with different ratios of ammonia to phosphorus pentoxide. These products are said to be valuable as water softeners, as are Woodstock's, and to hold calcium and magnesium ions of hard waters in solution or colloidal suspensions in the presence of fatty acid soap solutions.

There has been no suggestion in the art that any of the above-described complexes be neutralized with aluminum. It is apparent, however, that if they were, the aluminum would form salts therewith that could not be expected to differ appreciably from other complex aluminum phosphates, and that the aluminum would still retain its usual cationic character in such combinations.

In accordance with the invention, there are provided neutral water-soluble or colloidally soluble ionic complexes having phosphorus, oxygen, nitrogen, and aluminum, and/or chromium in an anionic portion of the molecule. These ionic complexes in all probability are polymeric in nature, and are composed of oxygen-, nitrogen-, phosphorus-, aluminum- and/or chromium-containing units in linear chains, or in a three dimensional network of indeterminate structure, linked in complex aggregates or aggregation polymers, perhaps similar to or related to heteropolyacid aluminum and/or chromium salts. However, aluminum and/or chromium is clearly present in the anionic portion of the molecule, and such aluminum and/or chromium is not cationic in character. Oxygen, nitrogen, and phosphorus also are in the anion. Additional nitrogen may be present in cationic form, as ammonium ion, and additional aluminum and/or chromium also may be, forming ammonium and aluminum and/or chromium salts of the anion.

Both aluminum and chromium apparently form the same types of complexes. No reason for this can be offered at the present time, since aluminum and chromium have little in common, so far as is now known, that would lead one to expect a similarity in this respect, except that both can exist as trivalent ions.

The complexes of the invention are soluble in or compatible with aqueous media having a pH above 2.5, including water and aqueous alkalis, such as ammonium hydroxide, and organic amines such as alkanolamines. In a 2% aqueous solution, they have a pH of above about 2.5, and usually within the range from about 5 to about 12. They can exist in the free acid form, in which case they have an acid number within the range from about 100 to about 400, and in the salt form, in which case they have an acid number within the range from about 0 to about 300.

The aluminum-containing complexes have many of the characteristics of the aluminum acid phosphates; for example, they display the valuable bonding characteristics of the aluminum phosphates of the prior art, and are valuable components in ceramics and refractories. Both the aluminum and chromium complexes also are capable of forming continuous flame-resistant glossy or translucent coatings and films, which are adherent to many types of substrates, including metals. These coatings and films are analogous to coatings of the aluminum acid phosphates. Because of their neutral reaction, they are compatible with acid-sensitive pigments. The complexes also serve as a neutral source of aluminum and/or chromium and other metals present, for instance, in fertilizers and catalysts.

Although the exact molecular composition of the anion portion of the complexes of the invention has not yet been established, the following empirical formula is completely definitive of the units composing the complex, which is polymeric in the solid state and at least in concentrated solutions:

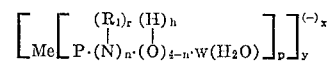

In this formula, $R_1$ is hydrogen, or an organic radical having from one to about thirty carbon atoms.

$R_1$ can be a hydrocarbon radical, such as alkyl, alkenyl, aryl, aralkyl, alkaryl, cycloalkyl, or heterocyclic, as such, or including the nitrogen in the heterocyclic ring, such as methyl, ethyl, isopropyl, propyl, butyl, isobutyl, tert-butyl, amyl, hexyl, heptyl, 2-ethylhexyl, isooctyl, octyl, nonyl, isononyl, decyl, dodecyl, octadecyl, behynyl, palmityl, allyl, hexenyl, oleyl, linoleyl, linolenyl, phenyl, benzyl, phenethyl, xylyl, tolyl, naphthyl, mesityl, nonylphenyl, octylphenyl, cyclohexyl, methylcyclohexyl, cyclopentyl, furyl, tetrahydrofurfuryl, pyridyl, piperidyl, quinolyl, morpholinyl and thiazinyl.

$R_1$ can also be an alkylol radical, such as hydroxymethyl, hydroxyethyl, $\beta$-hydroxypropyl, $\alpha$-hydroxypropyl, $\gamma$-hydroxybutyl, $\beta$-hydroxyhexyl, $\alpha$-hydroxydodecyl, or a phenylol radical, such as $\beta$-hydroxy-$\alpha$-phenethyl.

Me is aluminum or chromium, alone, or in admixture with each other, and/or with any metal, other than the alkali or alkaline earth metals, such as iron, nickel, zinc, arsenic, cobalt, copper, vanadium, manganese, beryllium, titanium, zirconium, tin, cadmium, lead, antimony, molybdenum, lanthanum and gallium, and combinations thereof. Such additional metal is added in a minor proportion, in substitution for part of the aluminum, and/or chromium, which constitute the major proportion.

$n$ is a number within the range from about 0.1 to about 3, preferably from 0.25 to 2.

$w$ is a number within the range from 0 to about 100, preferably, 0.5 to 2.

$p$ is at least equal to 1, and preferably is above 3. Normally, $p$ is within the range from about 1.5 to about 100.

$r$ is a number within the range from 1 to 2.

$h$ is a number in the range from about 0 to $(4-n)$.

$x$ is the valence of the anion, and will have a value determined by the preceding variables. It is always negative, and is in no way critical. The value of $x$ is usually 1, 2, or 3, but can be considerably higher. The value of $y$ is at least 1, and can range up to 20,000 or higher. $y$ is also not critical.

The molar ratios of phosphorus to nitrogen and of phosphorus to metal also are characteristic, and complement the empirical formula above in defining the complexes of the invention. The P:N ratio is from 10:1 to 2:6, preferably from 4:1 to 2:4, and the P:Metal ratio is from 1:1 to 100:1, preferably from 3:2 to 10:1.

It will of course be apparent that the anion as represented above will form salts with cations, or acids with hydrogen. The complex anion can be combined with any inorganic or organic cation, including not only aluminum and chromium, but also hydrogen, ammonium ($NH_4^+$), organic amines, such as triethanolamine, monoethanolamine, diethanolamine, and any of the amines referred to in column 9, lines 28 through 61, and the alkali and alkaline earth metals such as sodium, potassium, lithium, calcium, strontium, and barium, as well as magnesium, lead, tin, zinc, cadmium, iron, and nickel, as referred to above.

Compounds with this anion in the molecule can be hydrated with additional water. The water in the anion need not be in the combined form, as shown, and may actually be attached as hydroxyl and hydrogen.

Although the molecular structure of the anion is not known, it is postulated that oxygen in the anion is connected to either the phosphorus, or to the aluminum and/or chromium, or to both phosphorus and aluminum and/or chromium, the oxygen serving as a bridge between the phosphorus and the metal. However, the oxygen may also have both of its bonds attached to a single phosphorus atom, or connecting two phosphorus atoms. The nitrogen atoms are probably connected only to phosphorus atoms directly, or to hydrogen atoms. The nitrogen is probably present linked to phosphorus in the form of phosphoramido groups, which have been indicated by the fact that the complexes of the invention react with formaldehyde to form condensation products of the aldehyde-amide type. The nitrogen firmly held within the anion is not liberated in the form of ammonia when treated in the tests described later, and is referred to herein as anion nitrogen; the nitrogen sufficiently labile to be liberated in these tests is believed to be outside the anion, and is referred to herein as ammonium nitrogen.

Two examples of possible structures for ammonium acid salts of one complex anion, in the case where Me is Al, $p=4$, $n=1$, $r=2$, $h=1$, and $x=2$ ($y$ is unknown), are as follows:

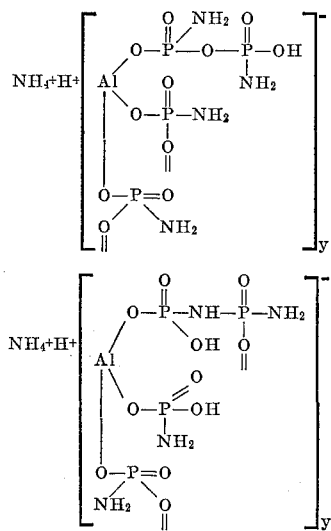

Oxygen atoms singly bound to phosphorus within the anion may be linked to the metal or to hydrogen, or may carry the negative charge associated with the anion. The placement of hydrogen atoms and negative charges on particular oxygen atoms is entirely arbitrary, as the various possible formulae represent limiting conditions of a system in dynamic equilibrium.

The properties of the complexes will be determined by the proportions of nitrogen, phosphorus, oxygen and metal, the structure arrangement thereof, and the cation or cations present outside the anion. Generally, the color of the solution formed will depend on the metals present, e.g. colorless for aluminum alone; emerald green for chromium; reddish-brown or brown, and sometimes blue when iron is present; blue for cobalt and copper; green for nickel; pink for manganese, etc. When aqueous solutions of the complex are diluted, the molecular weight may decrease, due to depolymerization, and stability may also decrease. However, the unusual feature of the anionic complexes of the invention, as opposed to the cationic acid phosphate complexes, is their solubility in even dilute aqueous solutions at a pH above 2.6. They form such solutions containing an amount within the range from about 0.1 to 75% and more by weight of the complex. The conventional cationic acid phosphate complexes of the prior art referred to will hydrolyze and precipitate at concentrations of 50% or less in aqueous media of pH above 2.6.

The properties of the solid complex salts are also in part determined by the $R_1$ group attached to the nitrogen in the anion. For example, when $R_1$ is hydrogen, the solid material is brittle and crystalline. When $R_1$ is $CH_2CH_2OH$, the material is a clear resin, softening above 140° C. and soluble in an equal volume of water.

According to the process of this invention, salts containing the complex anion are formed by reacting a concentrated solution of an acidic phosphate salt of aluminum and/or chromium (with an additional metal, if desired), preferably in the presence of an excess of phosphoric acid, with a compound having at least one —$NHR_2$ group, the hydrogen atom attached to the nitrogen in this group being labile. $R_2$ is hydrogen or an organic or phosphorooxygen radical as defined hereinafter, and as will be apparent from the later exemplification of —$NHR_2$ compounds.

During the reaction, as the pH of the solution increases, the proportion of water to metal phosphate is decreased sufficiently to prevent hydrolysis of the complex and precipitation of phosphate salt. This can be done by removing water, and also by adding acid phosphate salt and nitrogen compound, as the reaction proceeds.

Preferably, the reaction is carried out in an aqueous medium, and includes the following steps, which need not be in the order stated, but can be in any convenient sequence:

(1) Forming a concentrated aqueous solution of an acid phosphate salt of aluminum and/or chromium and any other metal concerned;

(2) Heating the metal salt solution to a temperature at which water is liberated;

(3) Adding a compound having an —$NHR_2$ group to the salt solution;

(4) Continuing the heating at a temperature at which water is liberated; and (5) Adjusting the rate of addition of the —$NHR_2$ compound and the rate of evaporation of water, so as to maintain phosphate salt in solution throughout the reaction.

In the course of the reaction, the temperature can be increased, if necessary, to maintain a sufficient rate of evaporation of water as the reaction proceeds. At some stage in the course of the reaction, the temperature should be brought to within the range from above about 150° to a temperature below the decomposition temperature, usually about 220° C., depending on the material, and maintained within this range until reaction is complete. This heating is required to form the anion containing the aluminum and/or chromium, converting any aluminum or chromium from the cationic state in which it may be present initially.

The relative amounts of the aluminum and chromium phosphates, phosphoric acid and —$NHR_2$ compound added will be determined by the proportions of aluminum, chromium, phosphorus, nitrogen and oxygen desired in the complex.

The aluminum or chromium acid phosphate salt can be added as such to the phosphoric acid. However, it is preferably formed in situ by mixing an oxide, hydroxide, or other suitable source of the aluminum, chromium, and any additional desired metals with an excess of a concentrated solution of a phosphoric acid to obtain the desired proportion of phosphorus (atomic equivalents) to metal (atomic equivalents) P:Me of from about 1.5:1 to about 100:1. The phosphoric acid is preferably at a concentration of at least 70% $H_3PO_4$. 83 to 85% $H_3PO_4$ is very satisfactory, and 115% polyphosphoric acid is especially advantageous, due to the low water content. However, the acid concentration is not critical. A lower acid concentration requires a longer evaporation time to remove water during the reaction, in order to prevent hydrolysis and precipitation after the —$NHR_2$ compound is added.

The formation of the aluminum or chromium acid phosphate salt is preferably carried out at an elevated temperature within the range from about 100° C. to about 130° C. The mixture is heated and water is expelled if necessary until a clear solution is obtained, containing at least about 70% solids, before the —$NHR_2$ compound is added.

However, it is not necessary that the aluminum and/or chromium compound be formed in situ before the —$NHR_2$ compound is added. The —$NHR_2$ compound can be reacted first with the phosphoric acid, and then the metal compound or compounds added and reacted with the resulting complex. In this case, the —$NHR_2$ compound will react with the acid to form a complex of the empirical formula:

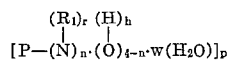

wherein $R_1$, $n$, $r$, $h$, $w$ and $p$ are as set out above in Formula I. This complex then is reacted in a second stage with the metal compound, and the metal compound enters the complex, which then, if it is not already, becomes anionic.

In this two step procedure, at least one of the steps is effected at a temperature above about 150° C., up to the decomposition temperature of the reaction product from that stage, usually not above about 220° C. Preferably, a minimum temperature of about 60° C. is maintained in the other step. In the first and second stages of reaction water is removed as required as pH increases so as to maintain metal phosphate salt in solution throughout the second stage.

In lieu of forming the aluminum and/or chromium phosphates in situ, phosphate salts derived from naturally-occuring phosphate mineral rocks such as wavellite, or from the leaching of phosphate rock, can be used. Such phosphate salts are dissolved in a concentrated phosphoric acid, to the desired $P_2O_5$ or phosphorus concentration, and then reacted as described above.

Starting materials for the aluminum and chromium, phosphates and other metal phosphates also include bauxite, slags, laterite (aluminum and mixed aluminum and iron oxides), pyrolusite (manganese dioxide), iron ores, chromite ores, zinc ores, such as zincite, chrome ore, and the like. Likewise, a variety of chemically reactive aluminum and chromium compounds are applicable for the purposes of the invention, examples being hydrated alumina, raw diaspore, clays, and activated aluminas such, for example, as an activated alumina prepared upon lightly calcining a rock-like form of alpha aluminum trihydrate, e.g. at about 600° to 900° F., and available commercially as Alcoa F Alumina, an activated alumina prepared by controlled calcination of a gelatinous alpha aluminum monohydrate and available commercially as Alcoa H Alumina, precipitated alpha aluminum trihydrate as produced by the Bayer process, chromic hydroxide, chromic oxide, chromic acid, chromic orthophosphate, chromic polyphosphate, and chromic acetate.

When the color of the final product is not critical, the oxides or the phosphates need not be purified first, and a mixture of the various metals, which often are present together, may be used.

The phosphoric acid used is generally orthophosphoric acid. However, polyphosphoric, metaphosphoric, tetraphosphoric, superphosphoric, or pyrophosphoric acids, or any other form of phosphoric acid, can also be used. These phosphoric acids and their corresponding acid salts are well known, and are fully described in the prior art, as for example, in the patent to Greger, No. 2,460,344, and in J. Am. Ceram. Soc. 33, 239 (1950) and 35, 61 (1952).

Superphosphoric acid and polyphosphoric acid are equilibrium mixtures of orthophosphoric, pyrophosphoric and higher linear phosphoric acids. Superphosphoric acid is equivalent to 105% $H_3PO_4$, or 76% $P_2O_5$; polyphosphoric acid is equivalent to 115% $H_3PO_4$, or 83.2% $P_2O_5$; orthophosphoric acid ranges from 75% $H_3PO_4$ (54% $P_2O_5$) to 85% $H_3PO_4$ (61.5% $P_2O_5$). About half of the phosphate in superphosphoric acid is present in the form of pyrophosphates and polyphosphates. (Agr. Food Chem. 9, 174 (1961) and Agr. Food Chem. 6, 298 (1958)).

The —$NHR_2$ compound has at least one —$NHR_2$ group, and can have two or more such groups. However, only one of such groups need have a labile hydrogen, so that additional groups can take the form —$NR_3R_4$. The compound is fully defined by the formula:

$R_2$, $R_3$, and $R_4$ are selected from the group consisting of hydrogen, organic radicals having from one to about thirty carbon atoms, such as alkyl, aryl alkylol, alkaryl, aralkyl, cycloalkyl, and heterocyclic groups, including heterocyclic rings in which the nitrogen is in the ring; and including other active groups such as carbonyl

amido —$CONH_2$ or —$CONHR_2$, amino —$NR_2R_3$, and imido

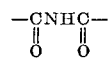

amidophosphoryl

and phosphoryl

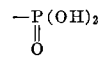

The simplest —$NHR_2$ compound is ammonia. However, addition of ammonia as well as low molecular weight volatile amines such as methylamine should be carefully regulated, and is best carried out under superatmospheric pressure. Alternatively, a special and preferred technique permits the reaction to be carried out simply and at atmospheric pressure if the volatile amine compound (e.g. ammonia) is formed during the reaction from a nonvolatile compound (e.g. urea) which decomposes to yield the volatile amine compound under the reaction conditions. It is particularly desirable for some uses if the second product resulting from this decomposition is a gas.

Compounds that decompose under the conditions of the reaction with metal acid phosphate to generate a —$NHR_2$ compound, such as ammonia, and a gas, such as carbon dioxide or monoxide, are referred to herein as foaming —$NHR_2$ compounds. Examples of suitable foaming —$NHR_2$ compounds are urea, formamide, cyamelide, ammonium cyanate, cyanuric acid, N methylurea, N,N'-diethylurea, N-phenylurea, and N-amylformamide. Urea is preferred. These compounds are almost without exception amides or diamides.

In addition to obviating the need for pressure systems, the foaming —$NHR_2$ compound also functions as a solvent medium as long as it is not yet decomposed to reactive —$NHR_2$ compound and gas.

When the foaming —$NHR_2$ compound decomposes, the carbonyl group present in these compounds is substantially lost as carbon dioxide or carbon monoxide gas. This causes a rapid foaming action in the reaction mixture, which is helpful as a gaseous diluent in assuring proper mixing and rapid reaction throughout the reacting mass. Ammonia or an amine is normally also formed, and hence these compounds can in most cases be regarded as ammonia donors.

—$NHR_2$ compounds of relatively low volatility, on the other hand, are conveniently added as such to the warm aluminum and/or chromium acid phosphate solution, at a rate kept in step with the removal of water, and the reaction mixture is then heated for some time at 150 to 200° C. to complete the reaction. With these —$NHR_2$ compounds no ammonia or carbon dioxide or monoxide is evolved. These amines are referred to as non-foaming —$NHR_2$ compounds.

The preferred class of non-foaming amino compounds are the alkylolamines, such as diethanolamine, and, preferably, monoethanolamine, mono- and dipropanolamines, mono- and diisopropanolamines, mono- and dibutanolamines, mono- and dipentanolamines, mono- and dihexanolamines, glycerolamines, cyclohexyl ethanolamine, alkylol polyamines such as N-hydroxyethylethylene diamine, monomethyl monoethanolamine, 1-amino-2,3-propane-diol; 1,2-diaminopropanol; 2-methylaminopropanediol-1,2; 1-phenylaminopropanediol-2,3; 1-hydroxyethyl-amino-2-methoxy-propanol-3; 2-N-methylaminopropanediol-1,3; 2-amino-2-methyl-1,3-propanediol; trimethylol aminomethane; 2-amino - 2 - n - propyl-1,3-propanediol; 2-amino - 2 - isopropyl-1,3-propanediol; 2-amino-2-ethyl-1,3-propanediol; 2 - amino - 2 - methyl - 1,4 - butanediol; 2-amino-2-methyl-1,5-pentanediol; 2-amino-2-ethylol-1,3-propanediol; 2-amino-2-methyl-1,6-hexanediol; hydroxyl amines derived from polyhydric alcohols, including sugars and sugar alcohols, such as dextrose, sucrose, sorbitol, mannitol, and dulcitol; polymerized alkylolamines made, for example, by heating alkylolamines such as monoethanolamine or diethanolamine or mixtures thereof, or other alkylolamines such as described hereinabove, at elevated temperatures, preferably in the presence of a catalyst such as sodium hydroxide, as disclosed in U.S. Patent No. 2,178,173; alkylamines such as butylamine, dimethylamine, diethylene triamine, triethylene tetramine, monomethylethylenediamine, and monoethyl diethylene tetramine, cyclopentylamine, cyclohexylamine, aniline, phenethylamine, toluidine, benzylamine, piperidine, furylamine, morpholine, 2-aminoquinoline, tetrahydroquinoline, naphthylamine and tetrahydroisoquinoline, dicyandiamine, melamine, acetoguanamine, stearoguanamine, and benzoguanamine.

The —$NHR_2$ can be partially replaced by ammonia, as long as enough —$NHR_2$ compound is present to function as a reactive solvent.

When the —$NHR_2$ compound is a foam producer, foam forms immediately when the decomposition temperature of the —$NHR_2$ compound is reached. Urea, for example, forms $CO_2$ at 95° C. or higher. The end point of the reaction is indicated by the solubility of a sample of the foamed reaction mixture in 2% aqueous ammonia. If the foaming reaction is carried out in a thin layer, with a large surface area, ammonia losses are kept to a minimum. The entire mass reacts very quickly, as there is very little lag in the temperature and reaction conditions between various parts of the reaction mixture. Accordingly, all portions reach the end point at approximately the same time, and the end point of the reaction, when the temperature is dropped to quench the reaction mixture, is more sharply defined. When the mixture is kept in a deep vessel, with a smaller surface area, a film or crust may form on the surface which restricts evaporation of water from the reaction mixture, and slows the reaction.

The foamed reaction product gradually hardens as it is heated at a temperature of between about 150° C. and 200° C., and eventually becomes friable, and can be ground into a powder.

An acid-resistant surface active agent can be added to the reacting mixture along with, or immediately before or after, the foam-forming —$NHR_2$ compound, to aid in forming a stable and more uniform foam. The acid-resistant surface active agent need be added to the reaction mixture only in a small amount, generally from about 50 p.p.m. to about 0.5%.

Suitable acid-resistant surface active agents are disclosed in the publication entitled "Synthetic Detergents and Emulsifiers," by John W. McCutcheon, published by Soap and Chemical Specialties (1955).

Surface active agents which show great resistance to concentrated acids and can be used for this purpose include certain anionic surfactants, e.g. sodium 2-ethylhexene sulfonate or sodium octylsulfate, and especially certain perchlorofluorocarboxylic acids and derivatives, e.g. as disclosed in British Patent No. 840,735 and U.S. Patents Nos. 2,951,783 and 2,559,752. These compounds have the general formula $X_1(CF_2—CFCl)_n CF_2(CH_2)_m R_4$ in which $X_1$ is fluorine, chlorine or bromine or a perhalomethyl radical containing fluorine, chlorine or bromine, $n$ is an integer from 2 to 9, $R_4$ is COOH, $NH_2$, $COOR_5$, or COOM (where $R_5$ is an esterifying alcohol group and M is a cation), and $m$ is 0 or 1, and 0 only when $R_4$ is a carboxylic group. Fluorochemical surfactants found especially useful for homogenizing and stabilizing the foam formed during the neutralization of the concentrated acid phosphate solution are sold under the trade names FC-95 and FC-98. These fluorochemical surfactants are very stable up to nearly 400° C. and show very high chemical stability (FC-95 can be refluxed for 48 hours in 50% $H_2SO_4$ without any decomposition). They lower the surface tension of phosphoric acid when added in extremely small concentrations, and are highly effective at the highest concentrations of phosphoric acid. According to data furnished by the manufacturer:

| Concentration $H_3PO_4$, percent | Surface tension | Percent FC-95 Added | Surface tension |
|---|---|---|---|
| 12.5 | 67 | 0.05 | 24 |
| 25 | 68 | 0.03 | 21 |
| 85 | 79 | 0.02 | 14 |

As low as 50 parts of fluorochemical surfactant FC-95 per million parts of concentrated solution of aluminum hydrophosphate-urea is effective to produce a uniform foam adaptable for this process.

The non-foam-forming $NHR_2$ compounds can be added to the acid phosphate solution at any temperature, but usually between about 90 and about 120° C. is convenient. The heat of reatcion may be sufficient to bring the reaction mixture to from approximately 150° to about 220° C. External heat can be supplied if required, the reaction mixture is stirred vigorously, and the reaction allowed to proceed until the product is neutral or slightly alkaline. The product is a resinous material, solid but tacky, noncrystalline, and has a flow point of 140° C. or higher. It can be dissolved in hot water, and conveniently, such solutions are prepared directly from the hot melt.

Generally, the higher molecular weight polymers are more useful as plasticizers for high mineral content coatings, or as chelating agents. To produce materials having higher molecular weights, the polymerized phosphoric acids are best used. The higher molecular weight organic amines will also be useful, but these will necessarily increase the proportion of organic material in the complex, which may be disadvantageous for certain uses.

Analytical tests have been devised to determine the molecular constitution of the complexes of the invention, and show whether nitrogen, aluminum and/or chromium and any other metal atoms present in the complex are in anionic or cationic form, or both, and how much of each form is present.

To ascertain anion nitrogen, ammonium (cationic) nitrogen outside the anion if first displaced and detected. The nitrogen not displaced in the test is bound in the anion, and the amount of anion nitrogen is therefore found by subtraction of ammonium nitrogen from total nitrogen.

The following standardized test for determination of ammonium nitrogen, as distinguished from ammonia obtained by hydrolysis of nitrogen present in the anion, was used in all the examples. The test is carried out by heating the complex in 2% aqueous KOH solution. A sample of the compound, approximately one gram, is dissolved in 200 cc. of 2% aqueous KOH, and heated at 95–100° C. while a stream of nitrogen is passed through the solution, then through a downward condenser and finally through a wash bottle containing 100 mls. of N/10 hydrochloric acid. In this way, ammonia liberated by hydrolysis with KOH is taken up by hydrochloric acid, and consumption of the hydrochloric acid is a measure of the amount of ammonia liberated. The contents of the wash bottle are sampled at 10 minute intervals, and the samples titrated to methyl red to determine the amount of absorbed ammonia by difference from the amount of starting hydrochloric acid. The end point is the point where the evolution of ammonia slows down appreciably, usually after about 30–40 minutes of heating with the KOH solution. If the heating is continued beyond this point, hydrolysis of the nitrogen present in thte anionic portion of the complex may result in the formation of ammonia, thus destroying the accuracy of the test. Under the conditions set out, the ammonia bound as ammonium ion by the acid complex, and not the ammonia developed by hydrolysis of the nitrogen present in the anion, is the only ammonia determined. The nitrogen content of the anionic portion of the complex is then taken as the difference between the total nitrogen and the ammonia nitrogen detected in the test.

An altenative test used in some instances for determination of ammonium nitrogen as $NH_3$ following the Victor Method of Analysis of Victor Chemical Works, Issue No. 1, Serial No. 55.0, June 4, 1953, is as follows:

A 0.5 g. sample of the complex is weighed into a 500 ml. Kjeldahl flask. 2 g. of magnesium oxide, 200 ml. of water, and 1 g. of granular zinc is then added, and the flask connected to a condenser and heated. 100 ml. of distillate is collected in 50 ml. of N/5 HC1. The hydrochloric acid solution is then titrated with N/10 NaOH against methyl red as the indicator. The percent free ammonia is detetrmined in accordance with the equation:

Percent $NH_3$ (free) = (100 ml. N/10 NaOH) × 0.34

To ascertain aluminum, chromium, and other metals as anion, test reagents for anionic and cationic metal are mixed into portions of a solution of the product to be tested.

The standardized test reagent used in the examples for metal cation is ammonia. Aqueous 2% ammonium hydroxide (about 2 cc.) or sufficient amount to render the solution of the complex salt alkaline, is added at room temperature to 5 cc. of a 2% solution of the complex. Any $Al^{+++}$ or $Cr^{+++}$ ion present will form a precipitate. If no precipitate is formed, the test result will be reported as negative, meaning no Al or Cr ion is present in cationic form.

The standardized test reagent used in the examples to detect metal-containing anions is 2% aqueous diisobutylphenoxyethoxy dimethylbenzylammonium chloride monohydrate, Hyamine 1622. 2 cc. of this reagent is added to a 5 cc. of 2% solution of the complex to which 0.5 cc. of 2% orthophosphoric acid has previously been added. If only metal cations such as $Al^{+++}$ and $Cr^{+++}$ are present, no precipitate will form, and if only metal-free anions such as $OH^-$ or $PO_4^\equiv$ are present, even in alkaline solution, no precipitate will form. However, a precipitate will form with any metal-containing anions present. Hence, formation of a precipitate indicates the presence of aluminum and/or chromium in the anion, and such formation as the test results is reported as positive. The formation of the precipitate is instantaneous and copious with compounds where $R_1$ is hydrogen, but where the $R_1$ is hydroxalkylene, such as $CH_2CH_2 OH$, precipitation may be slow, and less copious.

The following examples in the opinion of the inventor represent preferred embodiments of the above invention.

Example 1

1050 g. of 85% orthophosphoric acid (9 moles) was placed in a reaction vessel fittted with a stirrer and with a length of tubing reaching to the bottom of the vessel. 540 g. of monoethanolamine (9 moles) was then added, with stirring, at a rate of addition such that the temperature of the reaction mixture gradually increased to 140° C. At this temperature water began to be expelled from the reaction mixture. Heating at 140° C. was continued, and as water was removed, the boiling temperature gradually increased to 180° C., until 157 g. of water had been recovered, substantially all of the water added with the phosphoric acid.

The reaction mixture was held at 180 to 190° C. for one hour. The product obtained was a very light-colored yellowish resinous material which had a flow point between 110 and 120° C.

This intermediate product was converted into the ionic complex in accordance with the invention by stirring into the hot reaction mixture, held at 180 to 190° C., 180 g. (2.25 moles) of aluminum hydroxide. The aluminum hydroxide dissolved easily. After heating for one-half hour at this temperature, with stirring, a clear resinous material was obtained, flow point 145° C., which did not form a precipitate upon dilution with water. The pH of the aqueous solution was 6. The test for anion nitrogen was positive, for aluminum cation, negative, and for anion aluminum, positive.

The resinous material, when dissolved in an equal volume of water and applied evenly to paper or wood board, dried very fast to form a glossy coating which did not become brittle after two years' time.

Example 2

Example 1 was repeated, employing 9 moles of orthophosphoric acid and 6 moles of monoethanolamine. The reaction mixture was heated and stirred at 180 to 190° C. for one hour. After removal of approximately 102 g. of water, 180 g. (2.25 moles) of aluminum hydroxide was added, with stirring, to the hot reaction mixture. The aluminum hydroxide dissolved easily, and the reaction mixture was then heated at 180 to 190° C. for thirty minutes. A sample of the material at this stage gave a milky dispersion in water, and the pH was about 5. Three moles of monoethanolamine then was added with the temperature at 180° C. Heating was discontinued after all the monoethanolamine had been added. Mixed with equal parts of water, the resulting material gave a clear solution with a pH of about 7. The standardized tests showed nitrogen and aluminum present as cations; no anionic aluminum was detected.

The resinous liquid when dissolved in an equal volume of water, and applied evenly to paper or wood board, dried very fast to form a glossy coating which did not become brittle after two years' time.

Example 3

160 g. of aluminum hydroxide was dissolved in small increments, with stirring, in 1080 g. of 75% aqueous orthophosphoric acid. The heat liberated during the reaction was sufficient to bring the temperature of the reaction mixture almost to the boiling point. The heat necessary to bring the reaction mixture to boiling was supplied, and boiling and stirring continued with removal of water until the temperature was brought to 125° C. To the hot solution containing aluminum hydroxide and phosphoric acid in the molar ratio of 1:4, was added 480 g. of monoethanolamine, through tubing reaching to the bottom of the reaction vessel. The heat liberated during the addition of the monoethanolamine brought the temperature to 180° C. The addition of the monoethanolamine was slow enough to ensure that the temperature did not rise above 180° C., and the reaction was continued, with stirring, at this temperature for one hour, by the end of which time the water added with the orthophosphoric acid had been expelled along with the water of reaction.

There was obtained 1228 g. of a yellow resin having a flow point of 135 to 145° C. When diluted with water to a 75% solute concentration and to a 50% solute concentration, stable free-flowing clear solutions were obtained. The solutions had a pH of 6.5, and remained stable during storage for three years.

Application of the standardized tests showed that nitrogen and aluminum were present in the anionic portion of the molecule of this complex.

The reaction was repeated, using the same proportions of aluminum hydroxide, 75% orthophosphoric acid and monoethanolamine, but the reaction temperature was held at 115° C. maximum throughout the one hour reaction time. A clear solution was obtained.

When this solution was diluted to 75% solids concentration and a 50% solids concentration, stable solutions were obtained, similar in appearance to the preceding solutions. However, gelation set in within one hour. The 75% concentrate was stable for two months' time, after which it set to a gel; the 50% concentrate was stable for six days, and then set to a gel. The standardized tests showed nitrogen and aluminum present as cations; no anionic aluminum was detected.

This shows that reaction to form the ionic complex did not occur at 115° C.

Example 4

75 g. of aluminum hydroxide was dissolved in 350 g. of aqueous 85% orthophosphoric acid. The heat generated during the reaction was sufficient to bring the temperature to the boiling point of the mixture, 105° C. Heat was applied, with stirring, to continue expulsion of water, while the temperature gradually increased to 125° C., at which point 90 g. of monoethanolamine was added, through a tube reaching to the bottom of the reaction vessel. The addition of the monoethanolamine resulted in the liberation of heat, increasing the temperature to 180° C. The rate of addition of the monoethanolamine was controlled so that the temperature was held at about 180° C., and reaction continued with stirring at this temperature for one hour.

There was obtained approximately 400 g. of a yellow resin having a flow point of 135 to 145° C. This was neutralized by addition of 90 g. of monoethanolamine in 180 g. of water, bringing the pH from 6 to 7. The resulting product was a clear liquid, which remained stable without the formation of a precipitate after being held in storage for three years. The product could be diluted by the addition of water to form a 50% concentrate, without formation of a precipitate. The resulting solutions when applied to paper or wood board dried very fast to form a glossy coating which did not become brittle in time.

Application of the standaradized tests showed that nitrogen and aluminum were present in the anionic portion of the molecule.

Example 5

To 350 g. of 85% aqueous orthophosphoric acid was added, with stirring, in small portions, 54 g. of aluminum hydroxide and 12 g. of magnesium oxide. A considerable amount of heat was liberated, bringing the temperature of the reaction mixture to 105° C. Heating and stirring were continued, while the temperature gradually increased to 125° C., expelling a considerable portion of the water that had been present with the orthophosphoric acid. To the hot solution held at 125° C. was then added, with stirring, 180 g. of monoethanolamine, through a tube reaching to the bottom of the reaction vessel. A considerable amount of heat was liberated during the addition of the monoethanolamine, the rate of addition of which was controlled accordingly, so as to maintain the reaction temperature at 180° C., and reaction was continued at this temperature for one hour. Upon dilution of the reaction product with an equal weight of water, a pearly liquid was obtained which was free-flowing, although slightly viscous, and which, when applied to paper or wood board, dried rapidly to form a hard glossy coating. The pH of a 2% aqueous solution was 6.3. The standardized tests showed nitrogen, aluminum and probably magnesium in the anionic portion of the molecule.

Example 6

Bauxite (100 g., $Al_2O_3$, 58%, $Fe_2O_3$ 1.2%, $SiO_2$ 6%, $TiO_2$ 2.2%) was added to 800 g. of 50% orthophosphoric acid held in a reaction vessel equipped with a stirrer. The bauxite was added in small batches, with stirring, and the reaction temperature of the mixture was brought to the boiling point. Boiling was continued for two hours, and the precipitate separated. The filtrate was then boiled further until the solids content had been increased to 80%. 190 g. of monoethanolamine was added, with stirring, through a tubing reaching to the bottom of the vessel. The rate of addition of monoethanolamine was controlled so that the temperature of the reaction mixture increased to but was held at about 180° C. throughout the addition. The reaction was then continued at 180° C. for a total time of one hour. A clear solution of pH 6.5 was obtained when the reaction product was diluted with an equal weight of water.

This liquid when subjected to the standardized tests showed nitrogen and aluminum were present in the anionic portion of the molecule. The solution was perfectly stable, and did not form a precipitate on storage for three years' time.

This example was repeated, employing, in place of the monoethanolamine, a crude ethanolamine mixture composed of 78% monoethanolamine, 16% diethanolamine, 4% triethanolamine and 2% polyamines. 230 g. of this mixture was used, employing the same reaction conditions as previously. When the product was diluted with an equal weight of water, a clear liquid was obtained (2% aqueous solution, pH 6), which when subjected to the standardized tests showed that nitrogen and aluminum were present in the anionic portion of the molecule.

Both these reaction products were excellent film-formers, and when applied to paper and wood board, formed hard glossy films which did not become brittle on ageing.

Example 7

A mixed aluminum-iron complex was prepared according to the following procedure. 100 g. of the bauxite of Example 6 and 20 g. of ferric oxide were mixed, and then added in small increments, with stirring, to 800 g. of 50% aqueous orthophosphoric acid. This was processed as in Example 6. When the reaction temperature had reached 125° C., 280 g. of an ethanolamine mixture composed of 78% monoethanolamine, 16% diethanolamine, 4% triethanolamine and 2% polyamines was added, with stirring, through a tube extending to the bottom of the reaction vessel. The addition of the ethanolamine mixture was gradual, so that the reaction temperature was held at 180° C. throughout the addition. Heating was continued for one hour at this temperature. The reaction product gave a clear solution in a 75% concentration in water. The solution was completely stable, and did not form a precipitate on standing. The liquid could be diluted to a 75% concentration in water without the formation of a precipitate. The pH of the solution was 6.5.

The standardized tests showed that nitrogen, aluminum and probably iron were present in the anionic portion of the molecule.

Example 8

A fertilizer composition was prepared using the following procedure. A mixture was made up of 50 g. of aluminum hydroxide, 15 g. of iron powder, 15 g. of manganese dioxide, 10 g. of cupric carbonate and 5 g. of zinc oxide. This mixture was added gradually to 350 g. of 85% orthophosphoric acid.

The mixture of oxides was added slowly, with stirring. The temperature of the reaction mixture increased during the addition to 105° C., and heating was continued, with stirring, with expulsion of water until the reaction temperature had reached 125° C. There was then added, with stirring, 190 g. of monoethanolamine through a tube extending to the bottom of the reaction vessel. The addition of the monoethanolamine resulted in the liberation of a considerable amount of heat, and the reaction temperature quickly rose to 180° C. Thereafter, the addition was controlled so that this temperature was not exceeded, and the reaction mixture held at 180° C. for one hour. Dilution with an equal weight of water gave a clear solution. To the solution was added 180 g. of urea and 30 g. of Polyamine T, the amine residue obtained following ethanolamine distillation, composed primarily of ethanolamine polymers, to increase the pH of the solution from 6 to 7.

This composition was colloidally soluble in water in dilutions extending down to 5%, and was used as a fertilizer containing solubilized trace metal plant nutrients.

Example 9

52 g. of aluminum hydroxide was gradually added, with stirring, to 350 g. of 85% aqueous orthophosphoric acid. A considerable amount of heat was liberated, and the temperature increased rapidly to 105° C. Heating was continued with expulsion of water until the temperature had reached 125° C. There was then added, with stirring, a mixture of 120 g. of monoethanolamine and 37 g. of aminoethylethanolamine. The amines were added slowly, due to the liberation of heat, so that the reaction temperature was increased gradually to 180° C. but did not exceed this temperature. The reaction was continued at 180° C. for a total time of one hour. The product gave a clear solution when diluted with water to a 75% and to a 50% concentration, pH 6, without formation of a precipitate.

Application of the standardized tests showed that the product contained nitrogen and aluminum in the anionic portion of the molecule.

Example 10

75 g. of aluminum hydroxide was added in small increments, with stirring, to 350 g. of aqueous 85% orthophosphoric acid. The reaction temperature rapidly increased to 105° C. Water began to be expelled, and heating was continued, with stirring, and with expulsion of water until the reaction temperature had reached 125° C. There was then added a mixture of 100 g. of tetrahydroxyethylenediamine and 60 g. of monoethanolamine. The amines were added slowly through a tubing extending to the bottom of the reaction vessel. The reaction mixture was stirred vigorously throughout the addition, so as to hold the reaction temperature to a gradual increase to 180° C., but not beyond this temperature. Heating at 180° C. was continued, with stirring, for one hour. There was obtained a clear resinous viscous liquid, which could be diluted with water to a 75% and to a 50% concentration, pH 6.5, without precipitate formation. Application of the standardized tests showed the presence of nitrogen and aluminum in the anionic portion of the molecule.

Example 11

To 260 g. (3 moles) of 115% polyphosphoric acid (76% $P_2O_5$) was added 80 g. of aluminum hydroxide, gradually, with stirring, so as to restrain the increase in temperature of the reaction mixture, due to the liberation of heat. The temperature was brought to 125° C. When the temperature had reached 125° C. there was added a mixture of 90 g. of monoethanolamine and 105 g. of diethanolamine. The amines were added slowly, with stirring, so as to hold the reaction temperature to a maximum of 180° C. Heating was continued at this temperature with stirring, for one hour.

Upon dilution with an equal weight of water, there was obtained a clear stable film-forming liquid, slightly yellowish in color. This liquid did not form a precipitate, nor did it gel on storage for three years. The pH of a 2% aqueous solution was 6.5. Application of the standardized tests to this liquid showed the presence of nitrogen and aluminum in the anionic portion of the molecule.

Example 12

To 350 g. of 85% orthophosphoric acid was added 70 g. of aluminum hydroxide, in small increments, with stirring. The temperature increased, due to liberation of water, and finally reached 105° C., at which temperature water began to be expelled. Expulsion of water was continued while the temperature gradually rose until the temperature had reached 125° C., at which point there was added a mixture of 90 g. of monoethanolamine and 90 g. of urea. Foaming began at once upon addition of the urea, and the reaction mixture was then transferred to a large shallow pan which was placed in an oven preheated to 180° C. After ten minutes heating, the foam solidified to form a spongy, sticky mass which was cooled, and then dissolved in an equal weight of water. A cloudy solution was obtained, of pH 6. The solution was unstable, and after about one hour's standing solidified as a brilliant white paste.

The standardized tests showed that nitrogen and aluminum were present in the anionic portion of the molecule.

The example was then repeated, substituting 30 g. of monoethanolamine and 150 g. of urea. The acid aluminum phosphate solution was brought to about 95° C., and the mixed urea and monoethanolamine then added at this temperature, after which the mixture was immediately transferred to a shallow pan, and heated in an oven at 180° C. for ten minutes. The spongy product, when dissolved in an equal weight of water, formed a clear solution that did not form a precipitate on standing. The standardized tests showed that aluminum and nitrogen were present in the anionic portion of the molecule.

When repeating again, adding the urea at 95° C. as above, and using 130 g. of urea and 50 g. of 2-hydroxyethyl urea (prepared by melting together equal parts of water and urea and monoethanolamine until the evolution of ammonia diminished), a solid spongy product was obtained which also gave a clear 50% aqueous solution which was completely stable on standing. Application of the standardized tests to this reaction product also showed nitrogen and aluminum to be present in the anionic portion of the molecule.

Example 13

To 1400 g. of aqueous 85% orthophosphoric acid, equivalent to 12 moles $H_3PO_4$, was added, with stirring, 200 cc. of water and 240 g. (3 moles) of aluminum hydroxide. The addition of the aluminum hydroxide was accompanied by the liberation of heat, and the temperature of the reaction mixture increased to 105° C., at which temperature water began to be expelled. Heating was continued, with stirring, and a continued expulsion of water, until the reaction temperature had reached 125° C. The solution was then cooled to below 110° C., and 630 g. of urea (10.5 moles) was then added, together with 90 p.p.m. of FC-95 fluorocarbon surfactant.

Part of the reaction mixture was then placed in a large low pan to a depth of 1 mm., and this pan was placed in an oven heated to 190° C. A foam rapidly formed, and the mixture began to increase in volume. A sticky spongy mass was formed, approximately 30 mm. thick, which on continued heating at 190° C. hardened to a brittle friable sponge. Reaction was complete within ten mintues.

The remainder of the reaction mixture was placed in a second pan to a depth of 1 mm., and then placed in the oven and held at 150° C. Heating was continued at this temperature. A foam gradually began to form, and the volume of the reaction mixture gradually increased, but the reaction was considerably slower, and required two hours before a brittle, friable sponge 25 mm. thick had been formed.

The sponges thereby obtained were each pulverized to fine powders and mixed separately with water to form 60% solutions. A heavy paste was first formed, and this gradually became a clear viscous liquid upon continued stirring. The pH of the solution was slightly less than 7. A portion of this solution when diluted down to a concentration of 1% did not form a precipitate, nor did the dissolved material hydrolyze after two days' standing. The standardized tests showed that nitrogen and aluminum were present in the anionic portion of the molecule.

Example 14

To 1040 g. of polyphosphoric acid (115% $H_3PO_4$, equivalent to 83% $P_2O_5$) was added 400 g. of water. The heat of solution of the acid in the water increased the temperature of the acid mixture to 125° C. 240 g. of coarse aluminum hydroxide (Alcoa C33, 65% $Al_2O_3$, less than 15% moisture, and less than 0.3% having a particle size finer than 200 mesh) was then added, in small increments, with stirring. Throughout the addition of the aluminum hydroxide, water was expelled from the reaction mixture. The reaction mixture was heated until approximately 100 g. of water had been boiled off. There was then dissolved in the hot solution at 90° C. 630 g. (10.5 moles) of urea, together with 90 p.p.m. of FC-98 fluorocarbon surfactant. The mixture was then poured into a pan, to form a layer about 1 mm. thick, and the pan put into an oven at 190° C. The film foamed almost at once, and after ten minutes' time a brittle friable sponge about 30 mm. thick had been formed. The sponge was pulverized to a fine powder, and a portion of the powder mixed with water to form a 60% aqueous paste, which upon continued stirring formed a clear viscous liquid having a pH slightly below 7. This liquid could be diluted down to a concentration of 1% without formation of a precipitate. Application of the standardized tests showed aluminum and nitrogen in the anionic portion of the molecule. The pH in 2% aqueous solution of the white powder was 6.2 to 6.5, and the powder was soluble in water in the proportion of 7:3. It formed stable film-forming solutions at a maximum concentration of 70%, and when applied to paper and wood surfaces formed hard glossy coatings thereon.

This example was repeated, using 7 moles of urea in place of 10.5 moles. After the addition of the urea and the surface active agent, the reaction mixture was pumped into a cone mixer, where 7 moles of dry ammonia gas was added, with vigorous stirring. A considerable amount of heat was liberated, increasing the temperature of the mixture to approximately 150° C. The mixture, which had begun to foam and increase in volume, was rapidly piped to preheated trays held in an oven at approximately 190° C. Heating was continued at this temperature for ten minutes, forming a brittle, friable sponge. The sponge was pulverized, obtaining a white solid material, which formed clear colorless solutions in water. The standardized tests showed nitrogen and aluminum in the anionic portion of the molecule.

This procedure was repeated, reducing the amount of urea to 2 moles, and employing 17 moles of dry ammonia gas. Immediately upon addition of the ammonia the mixture set to a solid mass, which was insoluble in water and could not be processed. In this case, the amount of urea employed was insufficient to function as a reactive solvent in forming the ionic complex of the invention.

Example 15

464 g. (4 moles) of 85% aqueous orthophosphoric acid was heated to a temperature of 75°, and 80 g. (1 mole) of aluminum hydroxide then added, with stirring. A considerable amount of heat was liberated, and the temperature increased rapidly to 105° C., at which point water began to be expelled. Heating was continued while the temperature of the mixture gradually increased until it reached 125° C., at which point the soltuion became water-clear. 24 g. of water was lost during the heating, and the acid number of the resulting solution was 646. The solution was then cooled to below 110° C., whereupon 240 g. ( 4 moles) of urea was stirred in, and then 0.035 g. of FC-95 surfactant was added. The resulting liquid was poured into a pan to form a film approximately 1 mm. deep, and the pan placed in an oven preheated to 200° C. Heating was continued at this temperature for approximately 30 minutes, at which time a sample of the brittle foam which was obtained had an acid number of 124, and was soluble in 2% aqueous ammonium hydroxide. Chemical analysis showed 57% $P_2O_5$, 14.9% nitrogen. The ammonia test demonstrated that nitrogen was present in the anionic portion of the complex. The $P_2O_5$:$Al_2O_3$ ratio was 5.57. Thus, approximately 30% of the nitrogen added in the form of urea did not enter into the complex, and was lost, mostly as ammonia in the course of the reaction.

200 g. of this complex was stirred in a blender with 200 g. of ethyl alcohol, and 50 g. of concentrated hydrochloric acid was then slowly added. After 30 minutes of vigorous stirring, the suspended material was filtered through a suction filter, and the filter cake washed with small portions of water and alcohol until the wash water became practically neutral and chloride-free. The crystalline material consisted of the free-acid form of the complex, insoluble in water but soluble in monoethanolamine. This free acid was soluble in aqueous ammonium hydroxide.

The crystalline acid was carefully dried in vacuo, and had an acid value of 231. After one day's standing in moist air the acid value was reduced to 168, and after two days' standing, to 110, and it became more difficult to dissolve the acid in aqueous ammonium hydroxide. From these values, it was calculated that the original sample contained about 3.5% ammonia in the form of ammonium salt, that the acid was probably a dibasic acid, and that in the original product, one hydrogen was substituted by an ammonium ion or group. The free acid was neutarilized in a solution of aqueous ammonium hydroxide, and the diammonium compound was isolated by evaporating the resulting solution. However, the diammonium compound was not stable, and steadily lost ammonia when stored in air.

The acid analysis, percent $P_2O_5$ and percent N, correspond to the composition $[NH_4H\ Al(PO_3NH_2H_2O)_4]_y$, which theoretically analyzes as follows:

| | |
|---|---|
| Formula weight | 498 |
| $P_2O_5$ _____percent__ | 57 |
| Total nitrogen _____do____ | 14.05 |
| Ammonia _____do____ | 3.4 |
| $Al_2O_3$ _____do____ | 10.2 |
| Acid number as salt | 114 |
| Acid number as free acid | 233 |

The free acid of this complex would have an acid number of 233. Thus, the analysis of this product shows that it corresponds to the formula given.

Application of the Hyamine test to the acid solution of this complex gave a precipitate, showing that the aluminum was present in the anion.

The complex of the formula stated is different from aluminum phosphates and ammonium phosphates in admixture, which could yield the same analysis, as demonstrated by the application of the Hyamine test, showing that there is no free aluminum cation. The complex further was digested with aqueous hydrochloric acid in order to form the free acid in accordance with the preceding description, and the wash water obtained after separation of the free acid was examined for aluminum chloride. However, no aluminum chloride was found. This shows that there is no aluminum cation present in aqueous solutions of the complex.

Example 16

Example 15 was repeated, using the same procedure and the same amount of phosphoric acid and aluminum hydroxide, but with only 210 g. of urea (3.5 moles). The acid number of the phosphoric acid-aluminum hydroxide reaction product after the addition of the urea was 446. The solution was spread in a thin film in an open pan and heated to 200° C. in an oven, as in Example 15. 522 g. of a brittle foam was obtained after 10 minutes of heating. This foam was pulverized, and the resulting powder anlyzed 54.3% $P_2O_5$, 13.0% nitrogen, pH of a 2% aqueous solution 6.3. Analysis for ammonium nitrogen by the standardized test procedure gave 17.05 g. (14 g. N), out of a total nitrogen of 67.86 g. This shows that the amount of anion nitrogen present was 53.86 g., corresponding to approximately 3.84 atoms of nitrogen per formula weight. Taking into account experimental error, probably 4 atoms of nitrogen were present in the anion portion of the molecule, corresponding to one $NH_2$ group per phosphorus atom. This product therefore probably corresponds to the formula:

$$[NH_4H\ Al(PO_3NH_2H_2O)_4]_y$$

The complex was subjected to a further test to detect ammonium nitrogen, as a check of the above. The ammonia forming the ammonium cation or salt-forming portion of the complex can be determined by the reaction of the complex with a concentrated solution of calcium acetate. Calcium acetate displaces such ammonia, but not the nitrogen in the complex anion. In this test, 100 g. of the sample was slurried in a blender with 200 g. of cold isopropyl alcohol, and 150 g. of 25% aqueous calcium acetate solution. The mixture was stirred 30 minutes while the temperature was held at less than 10° C. in an ice bath. The mixture was then rapidly filtered on a suction filter, and the cake washed with cold water until the total volume of filtrate was about 1000 mls. The filtrate was then diluted to exactly 1000 mls.

50 cc. samples of the filtrate were analyzed for ammonia by adding 5 cc. of 50% aqueous sodium hydroxide, and analyzing for ammonia by distilling in the conventional way into N/10 hydrochloric acid solution, titrating the excess hydrochloric acid with N/10 potassium hydroxide, using methyl red as the indicator. The total of ammonia was then calculated in accordance with the formula:

$$NH_3 = \frac{cc. \times 0.0017 \times Formula\ weight}{5}$$

96.1 cc. of potassium hydroxide was required, corresponding to 17.05 g. of ammonia, constituting an excellent check of the preceding analysis.

Analysis of the filter cake for calcium by the ethylene diamine tetraacetic acid method (Frank J. Welcher, "The Analytical Uses of Ethylene Diamine Tetraacetic Acid," Van Nostrand & Co., New York, 1958, Chapter VI, 103–142) showed 12.5% as calcium, corresponding to the formula: $Ca_3H_2Al_2(PO_3NH_2)_8$, formula weight 936, calculated Ca. 12.8%. The data for the $NH_3$ analysis and calcium analysis show that there was one mole of $NH_4^+$ outside the complex, suggesting the formula for the complex salt of: $[NH_4H\ Al(PO_3NH_2H_2O)_4]_y$. Analysis for aluminum by the Hyamine test showed aluminum present in the anion.

Example 17

Example 16 was repeated, using exactly the same procedure, but substituting 225 g. of urea, approximately 3.75 moles. The acid number of the solution after addition of the urea but before foaming was 434.

500 g. of pulverized powder was obtained after completion of the reaction at 200° C. for ten minutes, and analyzed 56.8% $P_2O_5$, 14.05% nitrogen, pH of a 2% aqueous solution 6.8. Total nitrogen was 70.25 g. Ammonium nitrogen determined by the standardized test procedure of Example 16 was 16.79 g. (13.8 g. N) The anion nitrogen was accordingly 56.2 g., corresponding to 4 atoms of nitrogen per formula weight.

Using the calcium acetate test of Example 16, and distilling ammonia into N/10 hydrochloric acid solution, 97.7 cc. of KOH was required for the titration, corresponding to 16.78 g. of ammonia. This verified the preceding determination. The acid number of this product was 124.

Analysis for aluminum by the Hyamine test showed that aluminum was present in the anion.

Example 18

Example 15 was repeated, using the same proportions of phosphoric acid, aluminum hydroxide and urea. The pulverized white powder obtained at the completion of the reaction weighed 515 g., and analyzed 55.1% $P_2O_5$, 14.0% nitrogen, total nitrogen 72.1 g., pH of a 2% aqueous solution 6.5 Ammonium nitrogen in accordance with the standardized test was found to be 16.9 g. (14 g. N), giving an anion nitrogen of 58.1 g. This corresponded to approximately 4.15 atoms of nitrogen per formula weight, only very slightly different from the preceding Example 15.

Analysis of the complex salts by the calcium acetate procedure of Example 16 gave 97.0 cc. of KOH, corresponding to 16.97 g. of ammonia. This closely checked the previous determination.

The complex salt apparently corresponded to the formula:

$$[NH_4\ H\ Al(PO_3NH_2H_2O)_4]_x$$

Example 19

Example 15 was repeated, using the same quantities of 85% phosphoric acid, and aluminum hydroxide, with 360 g. (6 moles) of urea. The acid number of the solution before foaming was 375. The solution was foamed in a thin 1 mm. film at 200° C. for ten minutes. 560 g. of a white powder was obtained, analyzing 50% $P_2O_5$, 20.7% nitrogen, pH of a 2% aqueous solution 6.3. This is a total nitrogen of 117.5 g. The ammonium nitrogen, by the standardized test, was found to be 17.39 g. (14.3 g. N) thus giving 103.2 g. of anion nitrogen. This corresponded to approximately 7 atoms of anion nitrogen per formula weight.

The calcium acetate test procedure of Example 16 gave 90.1 cc. of KOH, corresponding to 17.39 g. of ammonia, thus checking the results obtained by the standard test.

This product evidently corresponded to the formula:

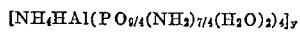

The Hyamine test for aluminum was positive, showing that aluminum was present in the anion.

Example 20

A crude orthophosphoric acid solution was prepared by digestion of 2150 g. of powdered Florida phosphate rock, 49.4% CaO, 34.4% $P_2O_5$, 5.1% $SiO_2$, in 2000 g. of 66° Baumé sulfuric acid together with 4000 g. of water. Gypsum precipitated, and was separated by filtration. The filter cake was washed, and the wash water added to the filtrate.

To this filtrate was added 450 g. of wavellite ore (27% $Al_2O_3$, 34% $P_2O_5$, 8% CaO). The wavellite was slowly dissolved by heating the reaction mixture to boiling, and with stirring. A 50% aqueous solution of the ore was obtained. Gypsum, which formed as a precipitate, was separated by filtration. The filtration was further concentrated, until an 80% solution of aluminum hydrophosphate in phosphoric acid was obtained.

To this solution was added 50 g. of urea, and 100 g. of ammonia gas. The urea was dissolved by thorough stirring and the solution then brought into a kiln, where it was reacted at 200° C. A grayish, brownish powder was obtained, which dissolved in equal parts by weight of water to form a viscous, opaque solution, pH 6.5. The powder analyzed 55.2% $P_2O_5$, 9.6% $Al_2O_3$, 14.7% nitrogen, acid number 128. The standardized tests showed nitrogen and aluminum in the anion.

This powder was useful as a fertilizer, because of the high nitrogen and phosphorus content, and its water solubility. Utility as a fertilizer was increased by treating the powder in an ammoniator with ammonia gas, to increase the ammonia content by 3%. The resulting compound was soluble in equal parts by weight of water, and could be applied as a fertilizer in the same manner.

This procedure was then repeated, preparing an 80% aluminum phosphate solution in phosphoric acid as before. To this concentrated solution was then added 100 g. of ammonia and 600 g. of urea. The additional urea was used to obtain a higher nitrogen content in the anion. This solution was brought into a kiln and reacted at 200° C. The reaction product, a brownish-white powder, soluble in an equal part by weight of water to form a viscous, opaque solution, pH 6.8, analyzed 52.3% $P_2O_5$, 9.4% $Al_2O_3$, 19.3% nitrogen. The standardized ammonia analysis procedure showed that over 16% of the nitrogen was present in the anion. The hyamine test showed aluminum in the anion.

Aqueous solutions of these products are compatible with potassium nitrate, ammonium nitrate, ammonium carbonate and other components used in fertilizer solutions.

Example 21

350 g. of 85% phosphoric acid was heated with 20 g. of boric acid until a soft jelly was formed. To this jelly was added 52 g. of aluminum hydroxide with stirring. The jelly liquified, and the solution became transparent, while considerable heat was liberated. The solution was then heated to the boiling point, and heating continued with expulsion of water while the boiling temperature gradually increased to 120° C. After cooling to 110° C., 180 g. of urea and 50 p.p.m. of FC–98 surfactant were added. The resultant solution was foamed in a thin film in an open pan, and heated in an oven at 200° C. for twenty minutes. 405 g. of a white powder was obtained, soluble in water in a ratio of 7 parts of powder to 3 parts of water, forming a viscous solution, pH 6.5, which was very stable in either concentrated or diluted form. The concentrated solution, when coated on a surface, deposited a dry film which was glossy and long-lasting. This film when formed on cellulosic materials increased flame resistance.

The powder was mixed with 10% by weight of Cab-O-Sil, an air borne silica. A free-flowing fine powder was obtained which dissolved in water to form a practically clear dispersion. This dispersion spread evenly on surfaces and, upon drying, formed a flexible film despite the absence of an organic plasticizer.

The free-flowing fine powder was mixed with pigments which, when the powder was dispersed in water, became finely dispersed with the powder. Such concentrated pigmented dispersions were found to be useful as fire-retardant paints.

Application of the standardized tests showed that the nitrogen and aluminum were present in the anion.

Example 22

100 g. of Bauxite (60% $Al_2O_3$, 1.5% $Fe_2O_3$, 7% $SiO_2$, 2.5% $TiO_2$) was dissolved in 800 g. of 50% aqueous orthophosphoric acid, and boiled for two hours. The impurities which separated in the form of a precipitate were removed by filtration. The filtrate was then heated and further concentrated by boiling to evaporate water to a solids content of about 80%, acid number 600. Into this solution was dissolved 240 g. of urea and 50 p.p.m. of FC–95 surfactant. The resulting solution was then poured in a thin film on a tray and heated in an oven at 200° C. for 20 minutes. A dry powder of an off-white color was obtained, which was soluble in equal parts by weight of water to form a viscous liquid, pH 6.2, from which transparent, quick-drying films were deposited. The powder gave a negative ammonia test, and a positive Hyamine test, showing that nitrogen was present in the anion, together with aluminum.

Example 23

464 g. of 85% aqueous orthophosphoric acid and 80 g. of aluminum hydroxide were mixed. The temperature increased rapidly to 105° C. at which point boiling began, with expulsion of water. Heating was continued, with stirring, while temperature gradually increased to 125° C. When the solution had reached this temperature, 408 g. (3 moles) of N-phenyl urea was then dissolved therein, and the solution poured in open pans and heated in an oven at 200° C. for one-half hour. The mixture foamed and increased considerably in volume, eventually forming a brittle, friable sponge. The sponge was pulverized. A total weight of 720 g. of an off-white powder was obtained. The powder dispersed in equal parts by weight of water, pH 6.5, and the dispersion gelled on standing to form a stiff paste. The equal parts by weight dispersion with water formed a coating which became water-insoluble on drying.

A mixture of 50 g. of this powder and 150 g. of the powder obtained in Example 20, dissolved in equal parts by weight in water, formed an opaque, viscous liquid from which a quick-drying coating was deposited.

The standardized tests showed aluminum and nitrogen in the anion.

Example 24

66 g. of Victamide (an ammonium salt of an amido-polyphosphoric acid condensate, 76.1% $P_2O_5$, 15.4% ammonia, 7% amido nitrogen (as $NH_3$)) was dissolved in 200 g. of water. To this solution was added 18 g. of 85% aqueous orthophosphoric acid, and there was then added 16 g. of aluminum hydroxide, (Alcoa C705, particle size less than one micron). The mixture was heated to boiling and boiling continued, with stirring, until all of the aluminum hydroxide had been dissolved. The pasty liquid became progressively more fluid as heating continued. After about 150 g. of water had been evaporated, the solution became clear, and very viscous. Films deposited from this solution were cohesive and glossy, and adhered very well to the surface on which this liquid was coated. The solid content of this liquid analyzed 59.0% P₂O₅, 14.52% nitrogen, 10.2% Al₂O₃, and had an acid number 113. The pH of 2% aqueous solution was 6.2, and the standardized tests showed nitrogen and aluminum in the anionic portion of the molecule.

Example 25

A mixture of 200 g. of 85% orthophosphoric acid and 200 g. of 115% polyphosphoric acid, together with 240 g. of urea, was heated at 80° C. until a clear solution had been formed. The resulting solution was spread on a tray and then heated in an oven at 200° C. The acid number of the solution before heating in the oven was 697, and after 5 minutes of heating in the oven, was 118. After 10 minutes heating, the acid number was 112, and with further heating the acid number rose to 176 at 20 minutes, and was still 176 at 30 minutes, whereupon the heating was interrupted.

A solid, brittle foam was obtained, which upon exposure to air, became rather sticky. The product was very soluble in water, and analyzed 62.8% P₂O₅, 24.6% nitrogen, corresponding to monoammonium phosphamate, NH₄HPO₃NH₂ (calculated, 24.6% nitrogen, 62.3% P₂O₅).

A solution was prepared composed of 85 g. of this compound in 100 cc. of water, and there was then stirred in 15 g. of aluminum hydroxide of very fine particle size (Alcoa C705). The mixture was then heated to boiling, while stirring was continued, and water evaporated. The pasty mixture started to liquify, and eventually formed a translucent liquid after about 50 g. of water had been evaporated. This viscous liquid, when tested by the standardized tests, showed nitrogen and aluminum present in the anionic portion of the molecule. The liquid had a pH of 6.0, and when coated on surfaces formed hard, glossy, films which were transparent, and which adhered well.

Examples 26 to 36

Eleven different products were prepared, starting with 85% orthophosphoric acid, aluminum hydroxide and urea, using different molar ratios of the reactants, ranging from 3 to 4 moles of the phosphoric acid, from ⅔ to 1.5 moles of the aluminum hydroxide, and from 1 to 6 moles of the urea. In all cases, the phosphoric acid and aluminum hydroxide were mixed, and the aluminum hydroxide dissolved therein. The reaction mixture was then heated to boiling, and boiling continued with expulsion of water until the temperature of the boiling mixture had reached 125° C. The mixture was then cooled to 110° C., and the urea added. After the urea had been dissolved, the mixture was poured onto an open tray, which was then heated in an oven at 200° C. for 20 minutes. The product that was obtained was analyzed for P₂O₅, Al₂O₃ and nitrogen. From these values the ratio of P₂O₅:Al₂O₃ and P₂O₅:N were calculated together with the acid number, and the standardized tests applied.

The P₂O₅:N ratio is correlated with water solubility of the complex. When this ratio is five or less, the complex is water soluble without the addition of an organic amine such as monoethanolamine. The P₂O₅:Al₂O₃ ratio is also correlated with water solubility, and when this ratio is more than four, the complex is water soluble. If either ratio is outside of this range, the complex is not water soluble, but it may be soluble in aqueous ammonium hydroxide or in an organic amine such as monoethanolamine.

The P₂O₅:Al₂O₃ ratio also controls the viscosity and stability of aqueous solutions of the complex. The higher the ratio, the less viscous the solution, and the more stable. If the ratio is less than five, the complex may be unstable.

In order to correlate acid number with the P₂O₅ content of the complex, the following calculation is made:

$$P_2O_5\text{—corrected acid number} = \frac{57 \times \text{acid number}}{\text{percent } P_2O_5}$$

This corrected value is based on a product containing 57% P₂O₅, the standard product of the formula:

$$[NH_4HAl(PO_3NH_2H_2O)_4]_y$$

| Example | Feed | | | Product analysis | | | P₂O₅:Al₂O₃ | P₂O₅:N | Acid No. (found) | 57×acid No. Percent P₂O₅ |
| --- | --- | --- | --- | --- | --- | --- | --- | --- | --- | --- |
| | H₄PO₄ | Al(OH)₃ | Urea | Percent P₂O₅ | Percent Al₂O₃ | Percent N | | | | |
| 26 | 3 | 0.6 | 3 | 51.3 | 8.1 | 14.2 | 6.4 | 3.7 | 125 | 138 |
| 27 | 3 | 1 | 1 | 60.0 | 14.3 | 7.0 | 4.2 | 8.6 | 317 | 300 |
| 28 | 3 | 1 | 2 | 57.0 | 13.6 | 13.1 | 4.2 | 4.4 | 225 | 225 |
| 29 | 3 | 1 | 3 | 52.6 | 12.5 | 13.8 | 4.2 | 3.8 | 134 | 145 |
| 30 | 3 | 1.5 | 6 | 35.5 | 12.8 | 13.8 | 2.7 | 2.5 | 66 | 106 |
| 31 | 4 | 1 | 1 | 62.0 | 11.1 | 7.2 | 5.6 | 8.6 | 330 | 303 |
| 32 | 4 | 1 | 2 | 56.8 | 10.2 | 12.0 | 5.5 | 4.7 | 215 | 215 |
| 33 | 4 | 1 | 3 | 50.0 | 8.2 | 13.8 | 6.0 | 3.6 | 136 | 155 |
| 34 | 4 | 1 | 3.5 | 54.3 | 9.7 | 14.3 | 5.6 | 3.8 | 132 | 140 |
| 35 | 4 | 1 | 4 | 55.1 | 9.8 | 14.8 | 5.7 | 3.7 | 124 | 128 |
| 36 | 4 | 1 | 6 | 50.0 | 8.9 | 20.7 | 5.5 | 2.4 | 88 | 103 |

Products 26, 30, 33, 34, 35 and 36 are all water-soluble. Products 27, 28 and 29 are water-dispersible; the P₂O₅:Al₂O₃ ratio is too low for water solubility. Products 31 and 32 are also water-insoluble because the P₂O₅:N ratio is too high for water solubility, but these products are water-dispersible. Products 27, 28, 29, 31 and 32 are soluble in monoethanolamine-water solutions.

Products 29, 31, 33, 34, 35 and 36 form excellent film-forming solutions, which deposit hard, glossy films that are oil and organic solvent-resistant and translucent-to-transparent in nature.

Product 30 gives aqueous solutions of the highest viscosity of all of the samples, and Product 26 gives aqueous solutions having the lowest viscosity. The hardness of the solid materials decreases, as aluminum decreases, from Product 29, which is the hardest, to Product 26, which is the most tacky.

All products were shown to have nitrogen and aluminum in the anionic portion of the molecule by the standardized tests.

Example 37

To 350 g. of orthophosphoric acid was added 70 g. of aluminum hydroxide, in small increments, with stirring. The temperature increased as heat was liberated, and finally, the mixture began to boil with evolution of water. Heating was continued to expel the water until the temperature had reached 95° C., at which temperature there was added a mixture of hydroxyethyl urea and ammonium phosphate made by mixing two moles each of monoethanolamine, 85% phosphoric acid and ammonium cyanate. The reaction mixture began to foam at once, and was promptly transferred to a shallow pan, and then heated in an oven at 180° F. for about ten minutes. A sticky sponge was formed which was water-soluble when dissolved in water to form a 50% aqueous solution. The standardized tests showed nitrogen and aluminum present as cations; no anionic aluminum was detected. When coated on paper, a glossy and relatively flexible film was obtained.

Example 38

25 g. of zinc oxide was dissolved in 500 g. of 85% orthophosphoric acid, heating the solution until all of the zinc oxide had dissolved. To the heated solution was then added 75 g. of aluminum hydroxide. The solution was brought to boiling and boiling continued until the solution became clear, at which point the boiling temperature was 125° C. 250 g. of urea and 50 p.p.m. of FC-95 surfactant was added. The reaction mixture began to foam, and was poured at once into a shallow pan and then heated in an oven at 180° C. for ten minutes. The foam solidified to form a hard, dry sponge. The yield was 602 g.

The sponge was pulverized to form a snow-white powder, which was soluble in an equal weight of water to form a solution which formed a nontacky coating when coated on wood, concrete and metal surfaces. The solution was stable, and had a pH of 6.5.

The standardized tests showed the presence of nitrogen, aluminum and zinc in the anionic portion of the molecule.

Example 39

21 g. of powdered manganese dioxide and 9 g. of iron powder was introduced into 530 g. of 75% orthophosphoric acid with stirring. A violent reaction with liberation of heat took place, and the initially black suspension was transformed into a greenish, creamy viscous liquid. 40 g. of aluminum hydroxide (Alcoa C33 of coarse particle size) was added, and the mixture then was heated to the boiling point, and boiling continued with expulsion of water until a transparent solution was obtained and the boiling temperature had reached 125° C.

240 g. of urea was added to the hot mixture, together with 0.001 g. of FC-95 surfactant, and the urea dissolved with stirring. The liquid was poured into a shallow tray, and heated in an oven at 200° C. for ten minutes. A very heavy foam formed, and the mixture increased considerably in volume, hardening to form a solid dry-appearing sponge, which could be pulverized to form a greenish powder. The powder was soluble in an equal weight of water to yield a very viscous brownish-greenish liquid which when coated on metals formed a hard adherent film. Baking this film in an oven at 160° C. for seven minutes resulted in an off-white ceramic coating on the metal.

The dry powder was compatible with oxidizing agents generally used in phosphatizing compositions, such as chromates and bromates, and adjuvants such as soluble copper, nickel and silver salts for which the product acted as a chelating agent.

The standardized tests showed the presence of nitrogen, aluminum, iron and manganese in the anionic portions of the molecule.

Example 40

25 g. of chromic acetate was dissolved in 50 g. of 75% aqueous orthophosphoric acid. The mixture was brought to boiling, and boiling continued until all acetic acid had been eliminated as its azeotrope with water. The resulting acid solution of chromic phosphate was added to a solution of 40 g. of aluminum hydroxide in 232 g. of 85% orthophosphoric acid prepared by heating the mixture until all of the aluminum hydroxide had dissolved. The resulting mixture was then heated to boiling, and boiling continued until the solids content had been increased to 80%. 150 g. of urea and 50 p.p.m. of FC-95 surfactant was added, and the urea dissolved in the warm solution with stirring. The mixture was then poured on a shallow tray, and heated in an oven at 200° C. for fifteen minutes. A hard, brittle, greenish sponge was obtained which was pulverized to form a light green powder. The powder had an acid number of 103, and dissolved in an equal weight of water to form an emerald green solution which hardened to a dark green glossy coating when coated on paper and wood surfaces.

This example was repeated employing chromium and aluminum in the ratio Cr:Al of 1:4, 1:3, 1:1 and 3:2. The properties of the products obtained were in every respect similar to the above in all cases, being water-soluble, and forming hard dark green glossy coatings when applied as the 50% aqueous solution to paper and wood surfaces.

The standardized tests showed the presence of nitrogen, aluminum and chromium in the anionic portion of the molecule.

Example 41

11 g. of manganese carbonate was dissolved in 270 g. of 85% aqueous orthophosphoric acid. Carbon dioxide was liberated, and after all the carbon dioxide had been expelled, 40 g. of aluminum hydroxide was dissolved in the pinkish solution. The solution was brought to boiling, and boiling was continued until the solids content had reached 80%, whereupon 150 g. of urea was dissolved in the solution, together with 0.001 g. of FC-95 surfactant. The mixture was poured into a shallow tray and heated in an oven at 200° C. for fifteen minutes. A hard brittle pinkish sponge was obtained, which was pulverized to form a pinkish powder, Acid No. 109. This powder was soluble in equal weight of water to form a slightly opaque viscous liquid of a pinkish color which imparted hard, glossy, pinkish transparent coatings when applied to paper and wood surfaces.

The standardized tests showed the presence of nitrogen, aluminum and manganese in the anionic portion of the molecule.

Example 42

25 g. of chromic acetate was dissolved in 50 g. of aqueous 75% orthophosphoric acid. The mixture was brought to boiling and heating continued until all the acetic acid had been eliminated in the form of its azeotrope with water. To the resulting acid solution of chromic phosphate there was added 25 g. of urea and 5 p.p.m. of FC-95 surfactant. The urea was dissolved in the warm solution by stirring, and the solution then poured on a shallow tray and heated in an oven at 200° C. for ten minutes. A light green, brittle sponge was formed. This was pulverized to form a light green powder, which was soluble in an equal weight of water to form a dark green transparent solution, which was completely stable on standing, pH 6.5. From this solution, a transparent film of dark green color, hard and nontacky, was deposited when the solution was coated on paper and wood surfaces.

Having regard to the foregoing disclosure, the following is claimed as the inventive and patentable embodiments thereof:

1. A process for forming an ionic complex having a pH in a 2% aqueous solution higher than about 2.5, and comprising in an anionic portion of the complex nitrogen, oxygen and phosphorus and at least one metal from the group consisting of aluminum and chromium, as evidenced by tests for anionic nitrogen and metal-containing anions, comprising the steps of reacting an aqueous acidic solution comprising phosphate and said metal with a nitrogen compound having an

group in the molecule, the hydrogen atom attached to nitrogen being labile, at an elevated reaction temperature within the range from about 150° C. up to the decomposition temperature of the reaction product, whereby during said reacting the pH of the reaction mixture will increase, and, as the pH increases, decreasing the proportion of water to phosphate sufficiently to prevent precipitation of phosphate salt, and prevent hydrolysis of the ionic complex.

2. The process of claim 1 which comprises heating the reaction mixture at a temperature within the range from 150° C. and 220° C. during the reaction.

3. The process of claim 1 wherein the proportion of water to phosphate salt is decreased by continuously removing water by evaporation.

4. The process of claim 1 wherein the metal is aluminum.

5. The process of claim 4 wherein an additional metal is present in the anion with the aluminum.

6. The process of claim 1 wherein the reaction is continued until the pH of the reaction mixture is within the range from about 5 to about 7.

7. The process of claim 1 wherein the nitrogen compound decomposes at the reaction temperature with liberation of a nitrogen-containing gas.

8. The process of claim 7 wherein the nitrogen compound is urea.

9. The process of claim 1 wherein the nitrogen compound is an ammonium salt of a phosphate oxide-ammonia reaction product which decomposes at the reaction temperature to form phosphoric acid and ammonia.

10. A process for the formation of an ionic complex having a pH in a 2% aqueous solution of above about 2.5, and comprising in an anionic portion of the complex nitrogen, phosphorus, oxygen and aluminum, as evidenced by tests for anion nitrogen and aluminum-containing anion, which comprises the steps of forming a concentrated aqueous acidic solution of a phosphate salt of aluminum, heating the aluminum salt solution at a temperature at which water is liberated, and concentrating the solution to an at least 70% solids content, adding an organic nitrogen compound having an

group in the molecule, the hydrogen atom attached to nitrogen being labile, and heating the resulting mixture at a temperature above about 150° C. up to the decomposition temperature of the complex, whereby the pH of the reaction mixture will increase, while maintaining a rate of evaporation of water as the pH of the mixture increases in the course of the reaction sufficient to maintain phosphate salt in solution throughout the reaction, and prevent hydrolysis in the complex.

11. A process for forming a complex containing complexed nitrogen, phosphorus and oxygen, and having the formula:

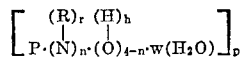

wherein $n$ is a number within the range from about 0.1 to about 3, $w$ is a number within the range from 0 to about 100, $p$ is a number within the range from about 1 to about 100, $r$ is a number within the range from 1 to 2, $h$ is a number within the range from about 0 to $(4-n)$ and R is selected from the group consisting of hydrogen and organic radicals having from one to about thirty carbon atoms, which comprises reacting an aqueous phosphoric acid solution with a nitrogen compound having in the molecule an

group and an organic radical having from one to about thirty carbon atoms, the hydrogen attached to nitrogen being labile, at an elevated temperature within the range from about 150° C., up to the decomposition temperature of the reaction product until the acid number of the reaction mixture is below about 200.

12. A process in accordance with claim 11, wherein the organic nitrogen compound is urea.

13. A complex containing complexed nitrogen, phosphorus and oxygen, and having the formula:

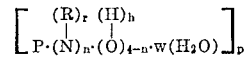

wherein $n$ is a number within the range from about 0.1 to about 3, $w$ is a number within the range from 0 to about 100, $p$ is a number within the range from about 1 to about 100, $r$ is a number within the range from 1 to 2, $h$ is a number within the range from about 0 to $(4-n)$ and R is selected from the group consisting of hydrogen and organic radicals having from one to about thirty carbon atoms.

14. A complex in accordance with claim 13, wherein R is hydrogen.

15. An ionic complex containing in an anionic portion of the molecule complexed nitrogen, phoshorus, oxygen and a metal of the group consisting of aluminum and chromium, as evidenced by tests for anionic nitrogen and metal-containing anions, and having a P:N molar ratio of from 10:1 to 2:6, a P:Metal molar ratio of from 1:1 to 100:1, an acid number below about 400, and a pH in a 2% aqueous solution higher than about 2.5.

16. An ionic complex containing complexed nitrogen, phosphorus, oxygen and a metal of the group consisting of aluminum and chromium in an anionic portion of the molecule, as evidenced by tests for anionic nitrogen and metal-containing anions, and having a P:N molar ratio of from 4:1 to 2:4, a P:Metal molar ratio of from 3:2 to 10:1, an acid number below about 400, and a pH in a 2% aqueous solution higher than about 2.5.

17. An ionic complex containing complexed nitrogen, phosphorus, oxygen and a metal of the group consisting of aluminum and chromium, as evidenced by tests for anionic nitrogen and aluminum-containing anions, and having the formula:

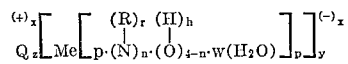

wherein Q is selected from the group consisting of hydrogen and salt-forming cations; R is selected from the group consisting of hydrogen and organic radicals having from one to about thirty carbon atoms, Me is selected from the group consisting of aluminum and mixtures of metals with aluminum having a major proportion of aluminum by weight; $n$ is a number within the range from about 0.1 to about 3; $w$ is a number within the range from 0 to about 100; $p$ is a number within the range from about 1 to about 100; $r$ is a number within the range from 1 to 2; $h$ is a number within the range from about 0 to $(4-n)$; and $x$ is the valence of the anion, $y$ is a number between 1 and about 20,000 and $z$ the corresponding number of Q ions to satisfy such valence, the complex having an acid number below 200, and a pH in a 2% aqueous solution of above about 2.5.

18. An ionic complex in accordance with claim 17 wherein Q includes ammonium.

19. An ionic complex in accordance with claim 17 wherein Q includes hydrogen.

20. An ionic complex in accordance with claim 17 wherein Q includes aluminum.

21. An ionic complex in accordance with claim 17 wherein R is hydrogen.

22. An ionic complex in accordance with claim 17 having a pH in a 2% aqueous solution within the range from about 5 to about 7.

23. The process of claim 5, wherein said additional metal is at least one metal selected from the group consisting of iron, zinc, manganese and boron.

24. An ionic complex of the formula:

$$NH_4 \cdot HAl(PO_3(NH_2)H_2O)_{4y}$$

where $y$ is a number between 1 and about 20,000.

25. An ionic complex of the formula:

$$H_2Al(PO_3(NH_2)H_2O)_{4y}$$

wherein $y$ is a number between 1 and about 20,000.

References Cited

UNITED STATES PATENTS

| | | |
|---|---|---|
| 2,222,734 | 11/1940 | Bancroft et al. _____ 71—27 |
| 2,222,735 | 11/1940 | Bancroft et al. _____ 71—27 |
| 2,690,377 | 9/1954 | Lefforge et al. _____ 23—105 |
| 2,909,451 | 10/1959 | Lawler et al. _____ 117—169 |
| 1,323,878 | 12/1919 | Levin _____ 23—105 |

OSCAR R. VERTIZ, *Primary Examiner.*

L. A. MARSH, *Assistant Examiner.*